May 29, 1923.
S. MUNSON
1,457,184
ADJUSTABLE BALL BEARING
Filed May 11, 1921
5 Sheets-Sheet 1
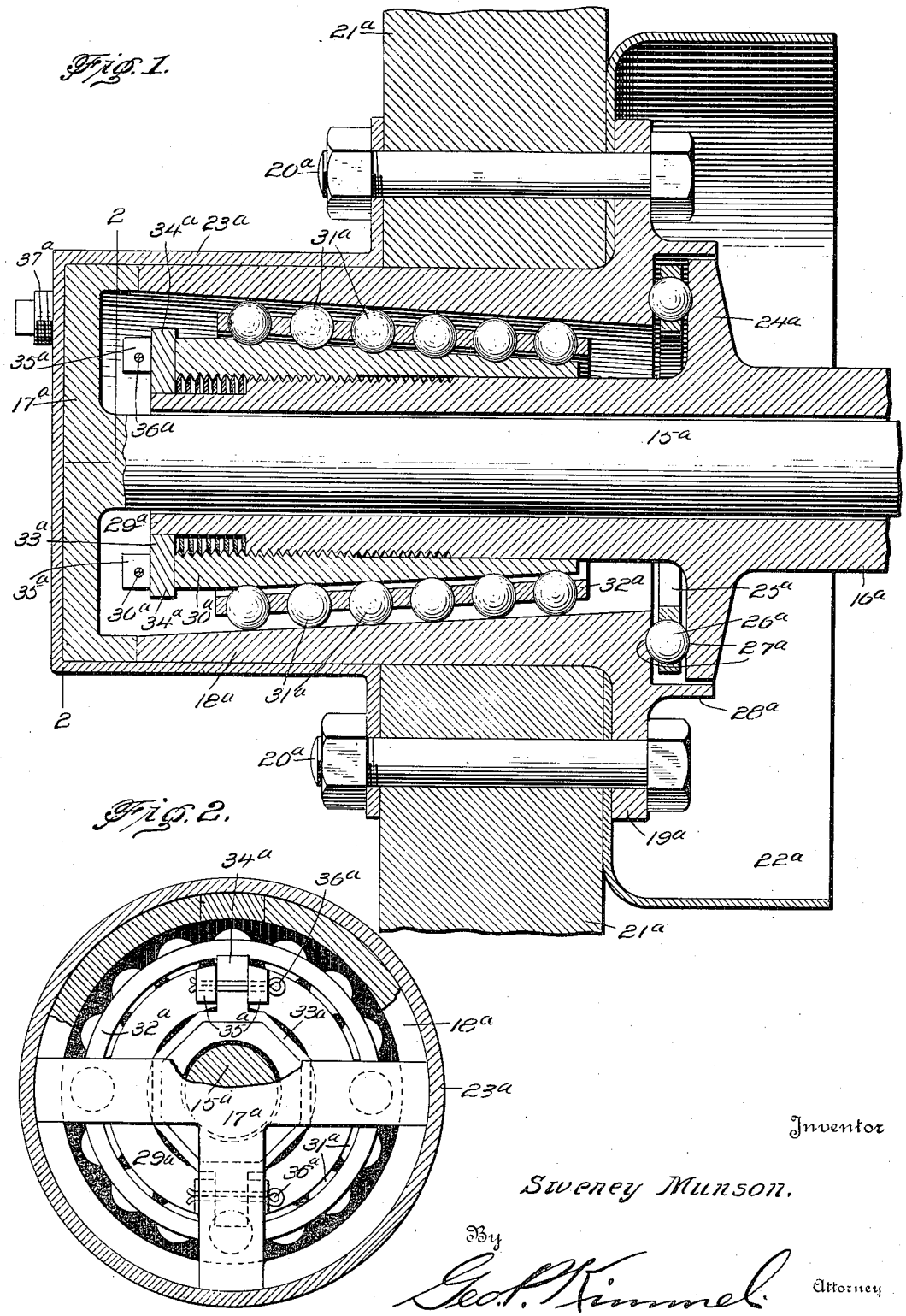
Inventor
Sweney Munson,
By Geo. F. Kimmel
Attorney May 29, 1923.  
S. MUNSON  
ADJUSTABLE BALL BEARING  
Filed May 11, 1921  
1,457,184  
5 Sheets-Sheet 2
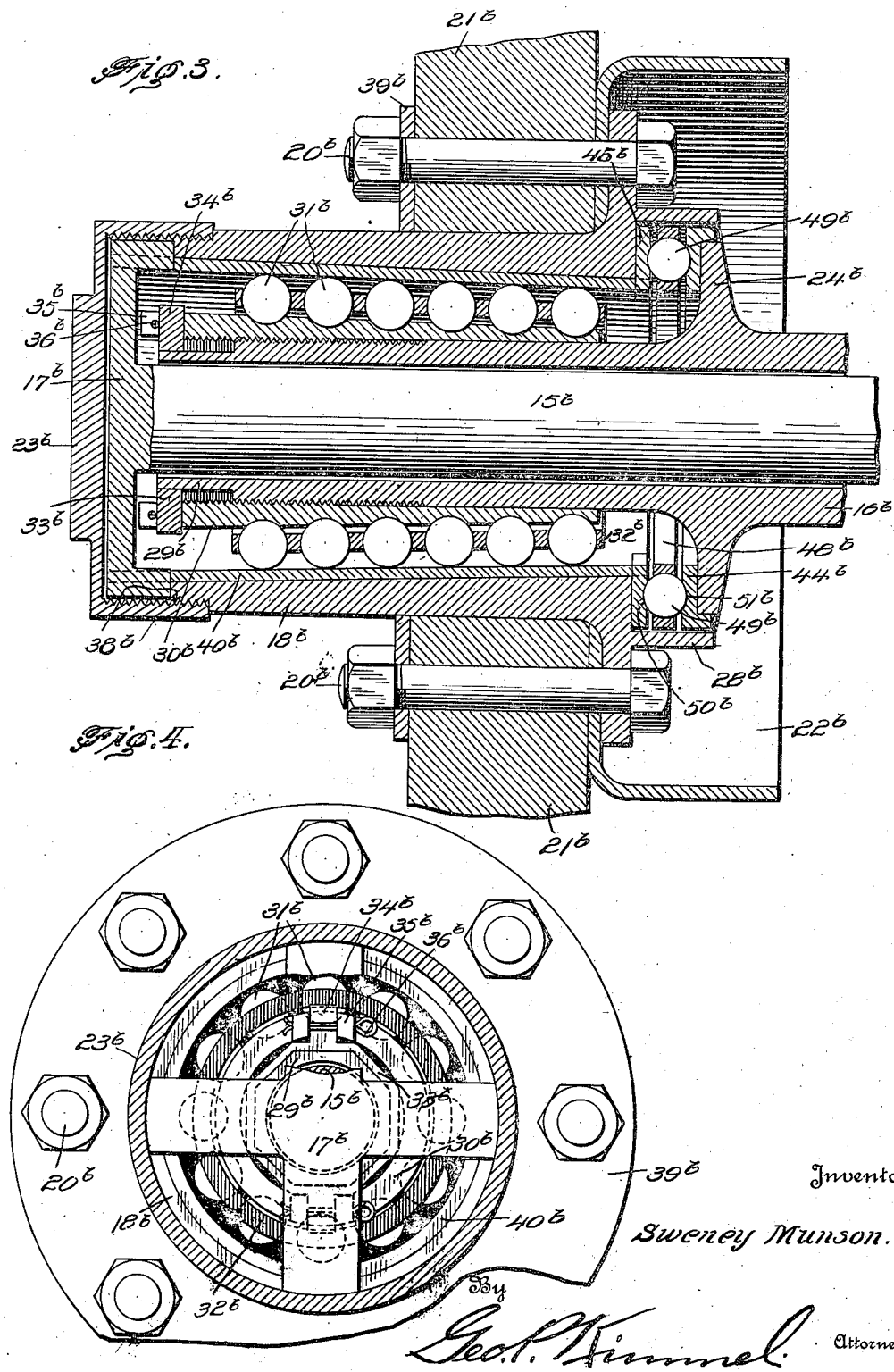
Inventor  
Sweney Munson.  
By Geo. P. Kimmel  
Attorney

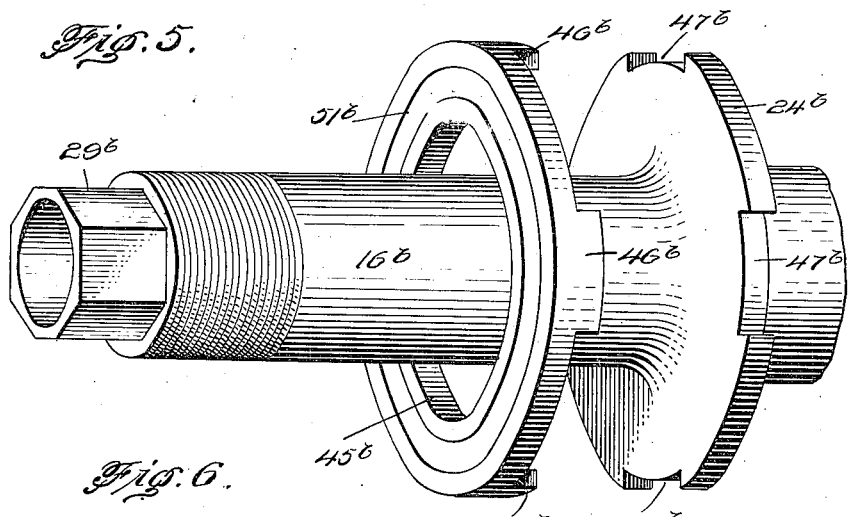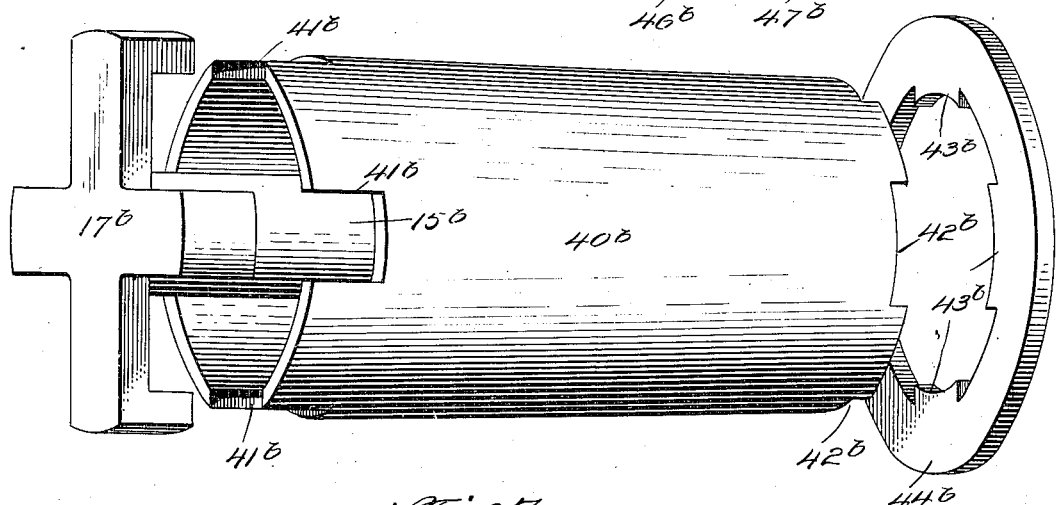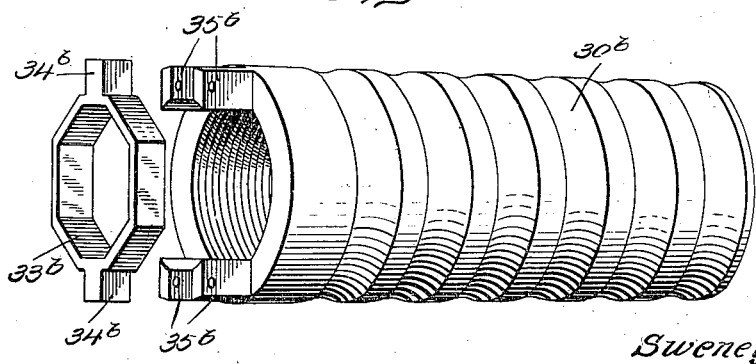

May 29, 1923.
S. MUNSON
ADJUSTABLE BALL BEARING
Filed May 11, 1921    5 Sheets-Sheet 4
1,457,184
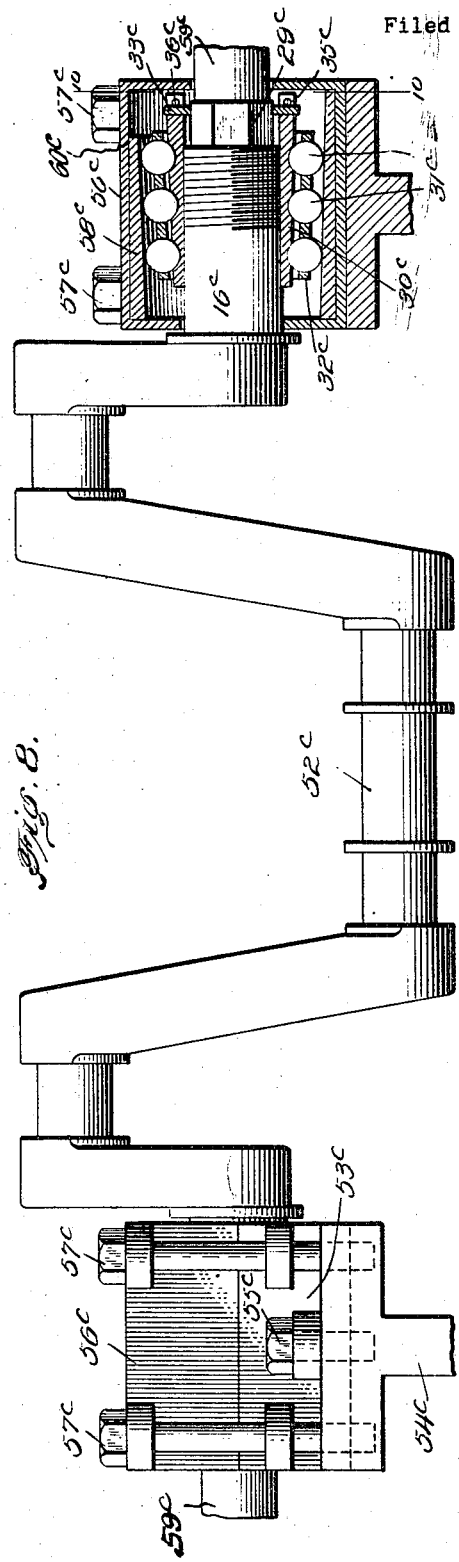
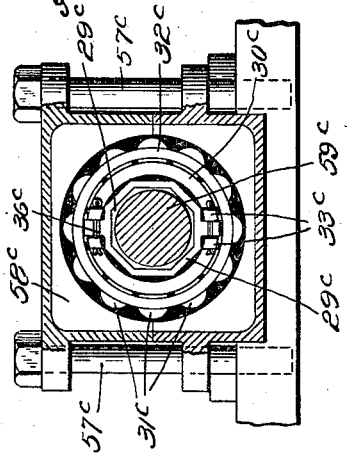
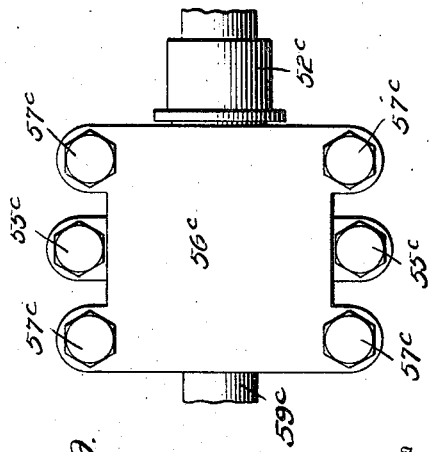
Inventor
Sweney Munson.
By
Geo. P. Kimmel.    Attorney

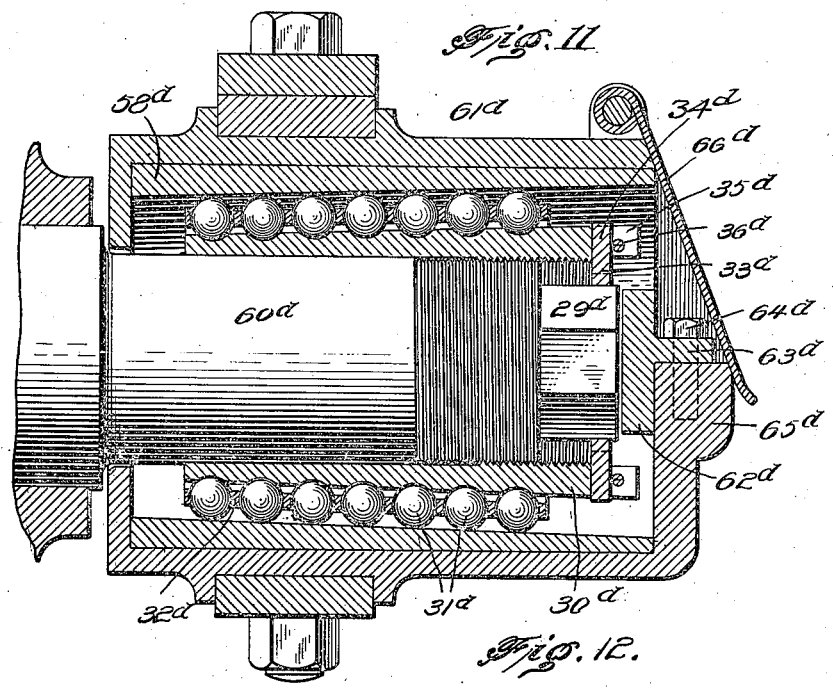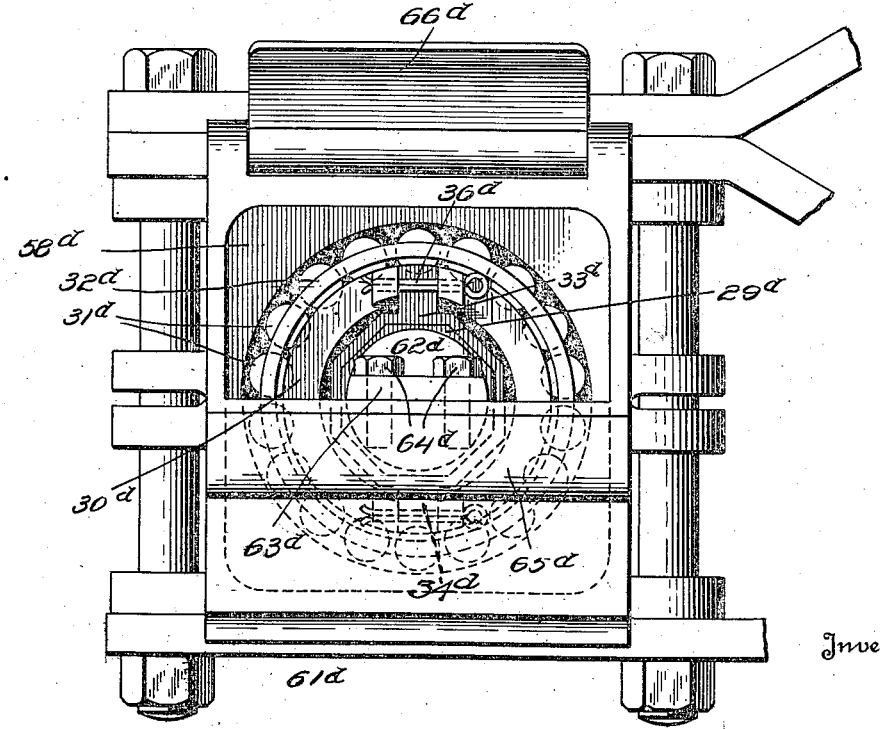

Patented May 29, 1923.

1,457,184

UNITED STATES PATENT OFFICE.

SWENEY MUNSON, OF FOWLER, COLORADO.

ADJUSTABLE BALL BEARING.

Application filed May 11, 1921. Serial No. 468,638.

*To all whom it may concern:*

Be it known that I, SWENEY MUNSON, a citizen of the United States, residing at Fowler, in the county of Otero and State of Colorado, have invented certain new and useful Improvements in Adjustable Ball Bearings, of which the following is a specification.

This invention appertains to certain improvements in anti-friction bearings, and more particularly to ball bearing types thereof adapted for general use, but otherwise especially applicable to the journalling of vehicle wheels of all classes and types.

A further object of the invention is to provide improved forms of ball bearings of the character mentioned, and which are of a nature as to be adjusted throughout a comparatively wide range for compensating for the wear of the parts thereof.

Another object of the invention is to provide for bearing constructions of the type set forth, and, in the preferred embodiments of which, the wear compensating parts thereof are standardized so as to be interchangeable for purposes of replacement, when worn to a degree of lessening the efficiency of the same, which replacement of the parts may be effected without necessitating any changes in the bearings proper, or requiring the entire dismantling of the bearings as a whole.

A further object of the invention is to provide for ball bearing constructions of the character mentioned, and to incorporate within the same, in addition to the features of adjustment for wear compensation, certain features of thrust compensation, the same being accomplished by similar anti-frictional arrangements of ball bearings.

A still further object of the invention is to provide the bearing adjustment with certain novel locking features, whereby the parts of the bearing are securely held in position against accidental displacement from all predetermined and adjusted positions one with respect to the other.

Another and equally important object of the invention is to provide for bearings characterized by the foregoing advantages, objects and features, and, in addition thereto, to provide for extremely simplified constructions, without reducing the high standard of efficiency desired for the same, and which are capable of being quickly assembled into position for use, or equally so, for the removal of the parts thereof for inspection, repair or replacement, due consideration also being given to the manufacture of the bearings at low cost as compared with present and known types of such devices.

With the foregoing and other valuable advantages, objects and features in view, the invention resides in the certain novel and useful constructions, and arrangements of the parts thereof as will be hereinafter more fully described, set forth in the appended claims, and illustrated in the accompanying drawings, in which:—

Figure 1 is a fragmentary vertical section through the hub portion of a wheel and showing the preferred embodiment of the invention as applied thereto, and positioned on the complemental end of a driven axle section, Fig. 2 is a transverse section taken on the line 2—2 of Fig. 1, Fig. 3 is a similar view to that of Fig. 1, but showing a modified form of the bearings, Fig. 4 is a fragmentary end elevation thereof, partly in section, Fig. 5 is a detail, in perspective, of the axle housing formation of the inner part of the hub bearings, as shown in Figs. 3 and 4, Fig. 6 is a detail, in perspective, of the axle and hub sleeve formation of the modified form of the invention, Fig. 7 is a detail, in perspective, of the wear compensating sleeve of all forms of the invention, and showing the locking means therefor, Fig. 8 is a fragmentary elevation of an engine crank shaft, and showing the manner of application of the improved bearings thereto, Fig. 9 is a top plan view of one of the bearing boxes or housings as of the form shown in Fig. 8, Fig. 10 is a vertical transverse section taken on the line 10—10 of Fig. 8, Fig. 11 is a vertical longitudinal section taken through a car axle journal box, and showing the application of one form of the invention thereto, and, Fig. 12 is an end elevation of the car journal box as in Fig. 11, the hinged closure of the same being raised to show the upper half of the bearing and its locking means, also in end elevation, therein.

Referring to the drawing, wherein similar characters of reference designate corresponding parts in the several views thereof, and more particularly to Figs. 1 and 2 of the same, the numeral 15ª indicates a full floating type of axle, common in automobile construction, arranged to turn freely within an axle housing 16ª and having its outer end formed to provide an integral clutch or spider 17ª adapted for driving engagement with the outer end of a wheel hub 18ª. At the inner end of the wheel hub 18ª is formed a radially extending annular flange 19ª, to the outer face of which is secured, by means of suitable fastenings or bolts 20ª, the wheel spokes 21ª, the inturned flange portion of a brake band drum 22ª being disposed between the opposed faces of the flange 19ª and the spokes 21ª, and the radially extending flange of a dust cap 23ª being clamped against the outer faces of the wheel spokes 21ª, all of a somewhat similar construction and arrangement corresponding to the present known types of so called "full floating" types of driven axle sections of motor vehicles.

In the application of the preferred form of the invention to the foregoing form of axle and wheel hub constructions and arrangements, the axle housing 16ª is to be formed to provide an annular flange 24ª having a flat outer face opposed to that of the inner end of the wheel hub 18ª, and spaced therefrom to provide an annular space for the reception of a thrust bearing, in the form of a cage 25ª carrying a set of ball bearings 26ª arranged in circular series one with respect to the other, the opposed faces of the inner end of the hub 18ª and the flange 24ª being formed with raceways or annular grooves 27ª for the reception of the complemental portions of the ball bearings 26ª presented to the same from opposite sides of the cage 25ª. The peripheral edge of the flange 24ª is encircled by an annular flange 28ª projecting laterally from the inner end of the wheel hub 18ª, whereby the thrust bearing space, between the flange 24ª and the wheel hub 18ª, is entirely closed against the ingress thereto of dirt and moisture, such as would otherwise be injurious to the bearing and decrease the efficiency of the wheel mounting as a whole. The outer enclosed end of the axle housing 16ª is formed to provide a reduced portion 29ª, preferably polygonal in form, and is threaded for a distance inwardly from the reduced portion for the threading into position thereon of an inwardly tapering wear compensating sleeve 30ª, which has its outer peripheral wall formed to provide a series of equidistantly spaced raceways or annular grooves 31ᵇ, each adapted to receive one of the sets of ball bearings 31ª carried by a sleeve form of ball cage 32ª. The bore of the hub 18ª is of a greater diameter throughout its length than that of the enclosed portion of the axle housing 16ª, and is tapered to a larger diameter outwardly from its inner end, and reversely with respect to the taper of the sleeve 30ª, whereby the wall of the bore of the same is contacted by the several circular sets of ball bearings 31ª, which are movable to and from such contacting relation by the screwing of the wear compensating sleeve 30ª inwardly and outwardly on the threaded portion of the axle housing 16ª, and by adjusting the sleeves 30ª inwardly on the axle housing from time to time, or as required, the wear of the parts of the bearing may be readily and effectively compensated for to maintain the efficiency of the bearing. For retaining the wear compensating sleeve 30ª in any of its positions of adjustment, a locking collar 33ª is removably engaged on the polygonal end portion 29ª, of the axle housing 16ª, and is formed with a pair of oppositely disposed and outwardly projecting lugs or studs 34ª, which are adapted for engagement between complemental pairs of extensions or ears 35ª, formed at points diametrically of the outer end of the sleeve 30ª, and which are normally held in such engagement by means of suitable fastenings, such as the cotter pin 36ª, the same being passed through alining openings formed slightly inward of the outer free ends of the extensions or ears 34ª, it being noted that the locking collar 33ª is of identical polygonal form to that of the polygonal reduced end portion 29ª, of the axle housing 16ª, so that it is impossible for the same to turn on the latter, and, consequently, the compensating sleeve 30ª is securely held against accidental unthreading action from adjusted postion, when the lugs or studs 34ª of the locking collar are engaged between the extensions or ears 35ª thereof. For purposes of lubricating the interior of the hub and the bearings therein, a normally closed vent 37ª may be provided in the end wall of the dust cap 23ª, the vent opening through the wall at a point between adjacent arms of the clutch or spider 17ª, of the axle section, for the introduction therethrough of the desired lubricant.

With the parts assembled, as shown at Figs. 1 and 2, and it is desired to adjust the wear compensating sleeve 30ª of the bearing, the nuts are to be removed from the bolts 20ª and the dust cap 23ª removed from the outer end of the hub 18ª, when the shaft section 15ª can be partly withdrawn outwardly of the housing 16ª, with the clutch or spider end of the same free from engagement with the complemental clutch recesses formed on the hub end, and the forward end of the sleeve 30ª, and its locking collar 33ª, will be exposed to view, and readily accessible for the adjusting operation, or for the removal of the parts, including the ball cage, for inspecways or grooves, equidistantly spaced one from the other, and adapted to receive the complemental sets of ball bearings 31ᶜ, carried in circular series by a cylindrical cage 32ᶜ. Surrounding the ball cage 32ᶜ, is a casting 58ᶜ, snugly fitted within the boxes or journals, and clamped in position therein between the sections of the same, and this casting is formed to provide a tapered bore encircling the wear compensating sleeve 30ᶜ, and the ball cage 32ᶜ carried thereby. The taper of the bore of the casting 58ᶜ is similar to that of the wear compensating sleeve 30ᶜ, so that the wall thereof is contacted by the ball bearings 31ᶜ, and, by which arrangement, whereupon the wear on the tapered wall surfaces thereof is to be compensated for by the threading of the sleeve 30ᶜ inwardly on the cylindrical portion 16ᶜ. The wear sleeve 30ᶜ is to be locked in its adjusted wear compensating position by means similar to that employed in the forms of the invention as hereinbefore described, and to give access to the sleeves 30ᶜ, and the locking means, the upper portion of the outer end of the casting 58ᶜ is cut away, as at 60ᶜ, for such purpose, whereby, upon the removal of the upper boxing section 56ᶜ, the cotter pins 36ᶜ may be readily withdrawn from the ears 35ᶜ, and the locking collar 33ᶜ withdrawn from engagement with the polygonal reduced end portion 29ᶜ, of the shaft, when the sleeves can be screwed inwardly the required distance to correspondingly adjust the ball bearings 31ᶜ in proper bearing relation with respect to the wall of the bore of the casting 58ᶜ, and, after which, the locking collar 33ᶜ can be slipped back onto the polygonal end 29ᶜ, and the cotter pins 36ᶜ again secured in the ears 35ᶜ formed at the outer end of the wear compensating sleeve 30ᶜ. In this instance, the thrust bearing formations are to be dispensed with for obvious reasons, since it will be apparent that the several bearings, one with respect to the other, will compensate for the shaft thrust.

Referring to Figs. 11 and 12, a further adaptation of the invention is shown, and, in this instance, the same is to be assembled in car axle journal boxes, a car axle being indicated at 60ᵈ, and the journal box generally at 61ᵈ. Threaded directly onto the free end of the car axle 60ᵈ, within the journal box 61ᵈ, is an inwardly tapered wear compensating sleeve 30ᵈ, and the same is grooved to provide raceways for the reception of the ball bearings 31ᵈ carried by a ball cage 32ᵈ. The outer exposed portions of the ball bearings 31ᵈ are adapted to bear against the opposed faces of the wall of the circular bore of a casting 58ᵈ, which bore is similarly tapered with respect to the taper of the sleeve 30ᵈ, and the casting 58ᵈ is snugly fitted into the journal box 61ᵈ, substantially as shown. In this instance, the tapered wear sleeve 30ᵈ is provided with pairs of spaced ears 35ᵈ adapted to receive between the same, the lugs 34ᵈ of a locking collar 33ᵈ, which is of a form adapted for engagement on the polygonal reduced end portion of the car axle 60ᵈ, to lock the sleeve 30ᵈ in any of its adjusted wear compensating positions, as hereinbefore set forth, and the locking collar is held in such engagement by means of the cotter pins 36ᵈ. To prevent the locking collar 33ᵈ from dropping downward out of alinement with the reduced portion 29ᵈ, of the car axle, when the same is slid outwardly from the latter for the adjustment of the wear compensating sleeve 30ᵈ, a circular disk or plate 62ᵈ, is disposed in alinement with the free end face thereof, and is held in such position by means of a lug 63ᵈ, formed angularly with the outer face thereof, being secured, by means of screws 64ᵈ, on the upper edge of the front wall portion 65ᵈ of the journal box. It is to be noted that the journal box is formed of a lower section and an upper section, suitably bolted together, whereby, upon the separation of the parts thereof, the several parts of the bearing may be assembled in position, or removed from such position for repair or replacement. To inspect the parts of the bearing, and to effect the adjustment of the same, all that is necessary is to raise the hinged closure 66ᵈ, of the journal box 61ᵈ, when ready access may be had to the interior of the latter for such purpose. It is also to be noted that the circular disc or plate 62ᵈ is positioned directly in line with the end of the axle 60ᵈ, so as to be impacted by the latter during its end thrust or play movement.

It is well understood that, while the preferred embodiments of the invention have been described and illustrated herein in its specific terms and details, various changes in the details of construction and arrangement of the same may be resorted to without departing from the spirit thereof, or from the scope of the claims appended hereto.

Having thus fully described the invention, what is claimed is:—

1. In an anti-friction bearing, a rotating hub, a driven axle extending concentrically through the bore of said hub, and having means detachably engaging in the hub for rotating the latter, a housing surrounding said axle and extending within the bore of said hub, an annular flange formed with said housing and spaced from the inner end of said hub, a ball cage in the form of a flat annulus interposed between the opposed faces of the inner end of said hub and said flange and having a circular set of ball bearings contacting the faces thereof, a sleeve adjustably movable on said housing within said hub, the opposed faces of the bore of said hub and said sleeve being correspondtion, repair or replacement. In either case, the cotter pins or fastenings 36ª are removed from the extensions or ears 35, and the locking collar 33ª withdrawn from its position on the polygonal reduced portion of the housing, and the lugs or studs 34ª thereof free from their position between the extensions or ears 35ª, when the collar 30ª may be unthreaded from the axle housing for removal, or threaded further onto the same for adjustment for wear, as the case may be. If for the latter purpose, after the desired adjustment is accomplished, the locking collar 33ª is pushed inwardly of the polygonal reduced portion 29ª, of the axle housing 16ª, with its lugs or studs 34ª passing between the extensions or ears 35ª, and the cotter pins or fastenings 36ª re-engaged in the alined openings of the latter, when the axle 15ª can be pushed into operative relation with respect to the differential mechanism of the automobile, and the clutch or spider 17ª thereof into driving engagement with the recessed hub end, after which the dust cap 23ª can be replaced on the outer hub end and secured by the threading of the nuts back on the bolts 20ª. To entirely remove the parts of the bearing, the axle housing sections 16ª must be entirely withdrawn outwardly of the hub, and the said parts removed from and replaced on the inner end thereof, the parts being slid along the axle section correspondingly for the purpose.

Referring now to Figs. 3 to 7, inclusive, wherein is shown a slightly modified form of the invention, the hub cap 23ᵇ, in this instance, is threaded directly onto a threaded extension 38ᵇ formed at the outer end of the hub 18ᵇ, while an annular ring 39ᵇ is fitted onto the outer hub end, and is secured against the outer faces of the spokes 21ᵇ, by means of the nuts on the bolts 20ᵇ, by which arrangement, the necessity of removing the nuts from the bolts 20ᵇ, with its consequent weakening or loosening of the wheel structure is eliminated. In this instance, it is contemplated to interpose between the ball bearings 31ᵇ and the wall of the bore of the hub 18ᵇ, a cylindrical metal wear sleeve 40ᵇ, which extends inwardly from the outer end of the hub to a point slightly beyond the inner end thereof, the outer end of the sleeve 40ᵇ being recessed, as at 41ᵇ, correspondingly with the end of the hub for driven engagement with the clutch or spider arm of the clutch or spider 17ᵇ, on the axle 15ᵇ. The inner projecting end of the sleeve 40ᵇ is formed to provide a set of equidistantly spaced recesses 42ᵇ, for the reception of a similar number of projections 43ᵇ, extending radially inward of the inner periphery of an inner raceway section 44ᵇ, which is of annular formation, and is adapted to be positioned in abutting relation against the inner end wall of the hub 18ᵇ, while a second or outer raceway section 45ᵇ, is positioned in abutting relation against the face of the axle housing flange 24ᵇ, and is retained in such position by means of a series of laterally extending projections 46ᵇ, see Figure 5, adapted for engagement in a corresponding number of recesses 47ᵇ, see Figure 5, formed in the peripheral edge of the flange 24ᵇ, of the axle housing. The opposed faces of the raceways 44ᵇ and 45ᵇ are spaced apart sufficiently to have interposed between the same, a cage 48ᵇ carrying a set of ball bearings in circular series, as at 49ᵇ, and the oppositely projecting portions of the latter are engaged in the grooves 50ᵇ and 51ᵇ thereof, respectively. With the exceptions, as hereinbefore noted, the remaining parts of this form of the invention are identical to that of the same as shown in Figs. 1 and 2, and such parts are designated by similar characters of reference. In this form of the bearing, the compensation for wear on the same is also effected through the medium of the adjustable tapered sleeve 30ᵇ, as in the first instance, and the locking means for this sleeve is likewise provided. By the provision of the hub sleeve 40ᵇ, the wear is taken by the same, and, when badly worn, can be withdrawn from the hub and a new one inserted into position, the assembly and dismantling of this structure as a whole, being identical to that as in the preferred form of the invention, with the exception, as before noted, that it is unnecessary that the bolts 20ᵇ be disturbed for the purpose.

Referring to Figs. 8, 9 and 10, I have shown an adaptation of the invention for use in the journaling of the crank shafts of engines and the like, and in this instance, a crank shaft 52ᶜ is to be journaled after the usual manner, suitable bearing boxes being disposed at opposite sides of each of the crank arms thereof for such purpose. These bearing boxes, or journals, each consists of a lower fixed portion 53ᶜ, secured in position on a portion 54ᶜ, of the crank case or frame of the engine, by means of bolts or lag screws 55ᶜ, and a removable upper or cap portion 56ᶜ adapted to be clamped in position on the fixed portion 53ᶜ, by means of bolts or the like 57ᶜ. The bearing portions 59ᶜ of the crank shaft 52ᶜ, are each machined or milled to provide the cylindrical portion 16ᶜ of a relatively large diameter at one end and a polygonal reduced portion 29ᶜ at the free end of the portion 16ᶜ, and inwardly from its free end, the portion 16ᶜ is threaded to receive an adjustable wear compensating sleeve 30ᶜ, the latter being tapered inwardly from its outer end and formed on its tapered surface with a series of annular raceingly tapered, a tapered ball cage interposed between the wall of the hub bore and said sleeve and having circular sets of ball bearings contacting the opposed faces thereof, and movable with the latter during its movements of adjustment, and means for locking said sleeve in any of its positions of adjustment.

2. In an anti-friction bearing, a rotatable hub, an axle extending concentrically through the bore of said hub and provided with laterally projecting elements detachably engaging in the hub for rotating it, a housing surrounding said axle and extending within the bore of said hub, an annular flange formed with said housing and spaced from the inner end of said hub, a ball cage in the form of a flat annulus interposed between the opposed faces of the inner end of said hub and said flange and carrying a circular set of ball bearings, annular raceways disposed at opposite sides of said ball cage and engaging the complemental portions of the ball bearings carried thereby, one of said raceways being removably positioned on the inner end of said hub and the other on said flange, a sleeve adjustably movable on said housing within said hub, the opposed faces of the bore of said hub and said sleeve being correspondingly tapered, a tapered ball cage interposed between the wall of the hub bore and said sleeve and having circular sets of ball bearings contacting the opposed faces thereof and movable with the latter during its movements of adjustment, and means for locking said sleeve in any of its positions of adjustment.

3. The combination with the driven axle of an automobile and a housing enclosing the axle, of a wheel hub encircling the outer end of said housing and having driving connections with the outer end of the axle, an annular flange formed on said housing and spaced inwardly of the inner end of said hub, a thrust bearing interposed between the opposed faces of said hub and said annular flange, an inwardly tapered sleeve adjustably mounted on said housing within said hub, the bore of said hub being correspondingly tapered with respect to the taper of said sleeve, a ball cage interposed between the tapered walls of said hub and said sleeve and carrying a plurality of circular sets of ball bearings arranged in contact with the opposed faces thereof, and a locking means cooperative with the housing and said sleeve for securing the latter in any of its adjusted positions.

4. The combination with the driven axle of an automobile and a housing enclosing the axle, of a wheel hub encircling the outer end of said housing and having driving connections with the outer end of the axle, an annular flange formed on said housing and spaced inwardly of the inner end of said hub, a ball cage having a circular set of ball bearings interposed between the opposed faces of said hub and said annular flange, raceways removably positioned on the inner end of said hub and on the opposed face of said flange to either side of said ball cage and cooperative with the ball bearings thereof, an inwardly tapered sleeve adjustably mounted on said housing within said hub, the bore of said hub being correspondingly tapered with respect to the taper of said sleeve, a ball cage interposed between the tapered walls of said hub and said sleeve and carrying a plurality of circular sets of ball bearings arranged in contact with the opposed faces thereof, and a locking means cooperative with the housing and said sleeve for securing the latter in any of its adjusted positions.

5. The combination with the driven axle of an automobile and a housing enclosing the axle, of a wheel hub encircling the outer end of a housing and having driving connections with the outer end of the axle, the bore of said hub being inwardly tapered, a wear sleeve snugly fitting the bore of said hub and having its inner end projecting slightly beyond the inner end of said hub, an annular flange formed on the housing and spaced from the inner end of said hub, a ball raceway carried on the inner end of said wear sleeve, a second ball raceway carried on said annular flange, a ball cage interposed between said raceways and having a circular set of ball bearings arranged in contact with the opposed faces of the latter, a wear sleeve adjustably mounted on the outer end of the housing within said hub and tapered corresponding with respect to the taper of the bore of the latter, a ball cage interposed between the opposed faces of said wear sleeves, and having a plurality of circular sets of ball bearings arranged in contact with the opposed faces thereof, and a locking means cooperative with the housing and said adjustable sleeve for securing the latter in any of its adjusted positions.

In testimony whereof, I affix my signature hereto.

SWENEY MUNSON.